H. SUTRO.

CARDS FOR WRAPPING THREAD.

No. 6,751. Reissued Nov. 16, 1875.

Witnesses:
B. S. Clark
Henry Eichling

Inventor:
Hugo Sutro

N. PETERS, PHOTO-LITHOGRAPHER, WASHINGTON, D. C.

UNITED STATES PATENT OFFICE.

HUGO SUTRO, OF NEW YORK, N. Y.

IMPROVEMENT IN CARDS FOR WRAPPING THREAD.

Specification forming part of Letters Patent No. 130,672, dated August 20, 1872; reissue No. 5,725, dated January 6, 1874; reissue No. 6,751, dated November 16, 1875; application filed August 11, 1875.

*To all whom it may concern:*

Figure 1:
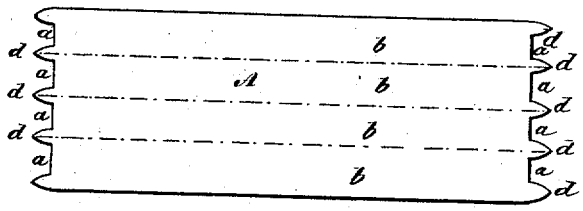
Figure 2:
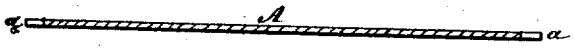

Be it known that I, HUGO SUTRO, of the city, county, and State of New York, have invented a new and Improved Device for Holding Braided and other Threads, of which the following is a specification:

Figure 1 represents a face view of my improved device for holding thread, braids, &c. Fig. 2 is a longitudinal section of the same.

Similar letters of reference indicate corresponding parts.

This invention relates to a new form for holding, and a new method of putting up, braided or other threads; and it consists in pasteboard card, or other equivalent material, notched at the ends, so as to produce visible and accurate subdivisions of the skeins wound thereon; and, also, in perforating or equivalently weakening or cutting such card lengthwise, to allow convenient separation of any one or more of the sections of card with the thread or skein upon it. This is for the purpose of keeping the skeins so fully separated that they cannot become entangled, and that they can, each skein containing a certain length of thread, be separated with their sections of card, so as to furnish a desired measure of thread or braid.

A in the drawing represents the card or form, around which the braided or plain thread, cord, or tape is wound lengthwise. The ends of this card are notched, as at *a a* in Fig. 1, there being as many notches as there are to be skeins or separate subdivisions wound about the card. In this manner the card is subdivided into a series of narrow sections, *b b*, each containing a certain quantity of the fabric, the projecting prongs *d d* between the recesses *a* keeping the several skeins properly separated.

The card may be perforated, or otherwise equivalently weakened, or cut lengthwise along a line or lines, (indicated by the dotted line or lines in Fig. 1 of the drawings,) so as to allow convenient separation of any one or more of the skeins with their sections of card *b*, so that the skeins can be disposed of separately without requiring their unwinding and special measurement.

The fabric is wound in skeins of the desired length upon each of the sections *b* of the card, as described, and all or a part of the skeins remain connected together, so as to constitute an unbroken length, or else the skeins upon the card that is simply perforated, or otherwise equivalently weakened, between the said sections, may be disconnected, so as to form independent and separate pieces of the fabric upon the several sections *b*.

Thus put up, the fabric, which may consist in woven, braided, or twisted cord, tape, ribbon, braid, thread, wire, or any other narrow articles measured by the yard, cannot tangle, twist, or soil.

Under the old style of putting up such goods, they were very apt to become entangled, and, as they had to be separately measured in dealing out certain lengths, they were often soiled and twisted out of shape.

Having thus described my invention, I claim as new and desire to secure by Letters Patent—

1. The device for holding thread consisting of card-board notched at the ends, so as to separate said threads into two or more sections or skeins, as set forth.

2. The device for holding thread consisting of card-board notched at the ends, and perforated lengthwise, so as to be formed into sections, to allow of convenient separation of the sections and skeins of thread, as and for the purpose set forth.

3. The improved method described of putting up thread or any narrow fabric in skeins on card-board notched at the ends, by winding the fabric continuously from one notched section of the card-board to another, as and for the purpose set forth.

Witness my hand this 10th day of August, 1875.

HUGO SUTRO.

Witnesses:
B. S. CLARK,
FRED. BOND.